United States Patent

[11] 3,612,598

| [72] | Inventors | Roy P. Keslin<br>1240 Prince Drive, South Holland, Ill. 60473;<br>Ralph W. Keslin, 1428 Stateline Ave., Calumet City, Ill. 60643 |
|---|---|---|
| [21] | Appl. No. | 804,830 |
| [22] | Filed | Mar. 6, 1969 |
| [45] | Patented | Oct. 12, 1971 |

[54] POWER PLANT HAVING COMPRESSOR-POWERED ASPIRATING SYSTEM
9 Claims, 2 Drawing Figs.

| [52] | U.S. Cl. | 290/52, 290/1, 60/108 |
|---|---|---|
| [51] | Int. Cl. | H02k 7/18 |
| [50] | Field of Search | 60/266, 39.29, 39.09, 39.15, 108; 290/58, 52, 1, 1.3; 109/1, 15; 98/2; 310/53 |

[56] References Cited
UNITED STATES PATENTS

| 1,778,036 | 10/1930 | Noble et al. | 290/1.3 |
| 2,508,397 | 5/1950 | Kane | 290/52 X |
| 2,511,854 | 6/1950 | Kane | 290/52 |
| 3,242,345 | 3/1966 | Kimura et al. | 290/52 |
| 3,362,155 | 1/1968 | Driscoll | 415/168 |
| 3,418,485 | 12/1968 | Anderson et al. | 290/52 X |
| 3,453,443 | 7/1969 | Stoeckly | 290/52 |
| 1,987,456 | 1/1935 | Woodard | 98/2 |
| 3,181,554 | 5/1965 | Cook et al. | 109/15 X |

*Primary Examiner*—G. R. Simmons
*Attorney*—Hill, Sherman, Meroni, Gross & Simpson ABSTRACT: An enclosure for a gas turbine power plant in which the noise of the ventilating and the fuel air is at a minimum will be provided by the structure of the invention wherein the entering and exhausting air volume as well as the openings through which the air passes is kept to an absolute minimum. Three inlets and two outlets to and from the atmosphere include a primary fuel air supply opening at each end of the building generally above a gas turbine inlet, a secondary air supply opening centrally positioned in the enclosure and an exhaust vent from the outlet end of each turbine. The portion of the air supply entering through the second opening is drawn through the interior of the enclosure and through the generator itself thereby ventilating the latter before the air is burnt in the gas turbine. Careful design of the openings in accordance with the fuel air requirements of the turbine assures that while only the exact amount of air necessary to operate the turbines enters the enclosure, a portion of it provides the additional function of ventilating the enclosure and the generator.

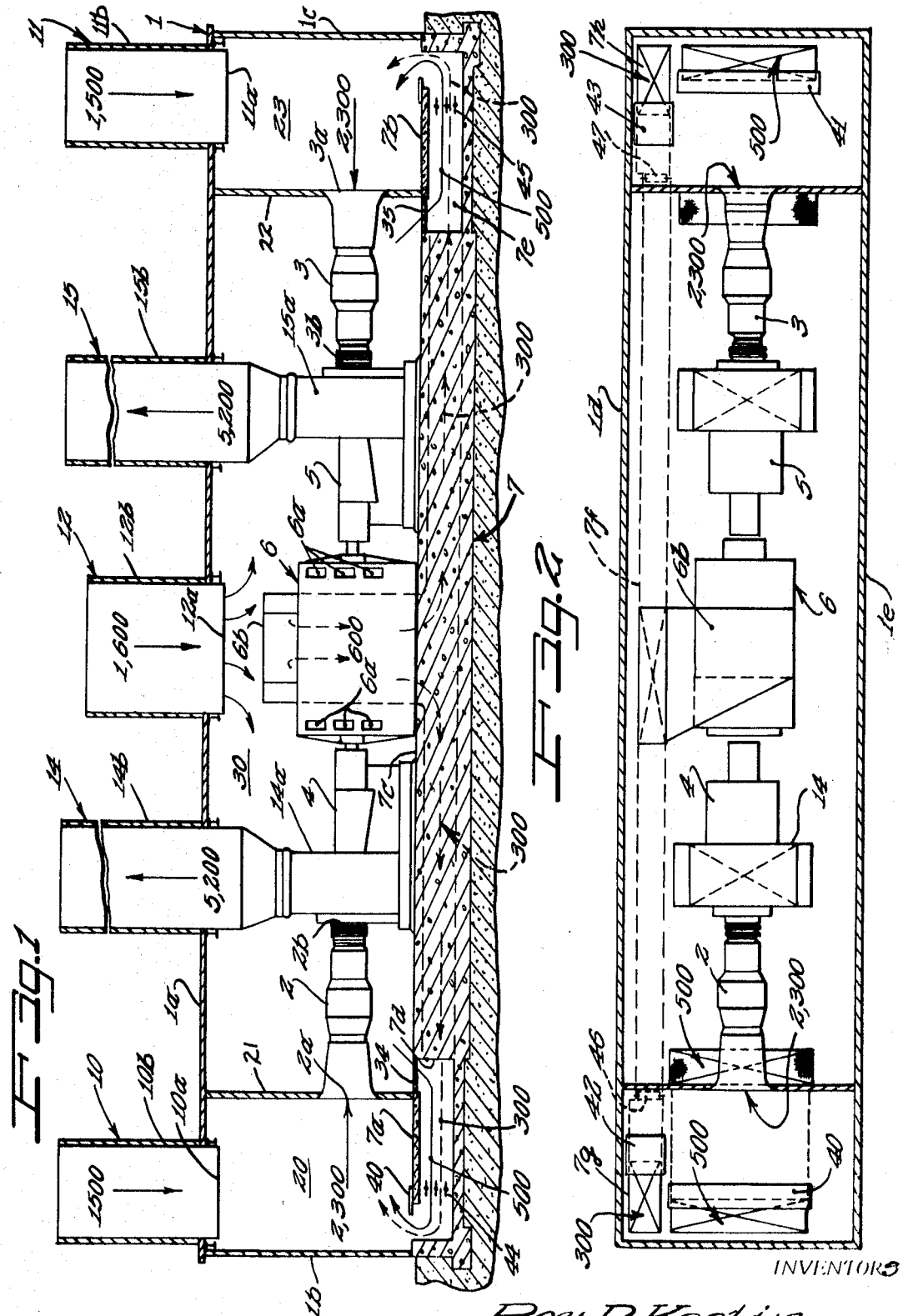

POWER PLANT HAVING COMPRESSOR-POWERED ASPIRATING SYSTEM

BACKGROUND OF THE INVENTION

1. Field of the Invention

This invention relates generally to the ventilation of power generator enclosures and more particularly to an aspirating system for a gas turbine power plant wherein the gas turbine compressor provides the sole air moving means.

2. Prior Art

It must be understood that a gas turbine power plant operates at a very high noise level which may be controlled by isolating the noise-producing parts of the power plant in an enclosure. Any openings in this enclosure will of course allow noise to escape and thus must be treated in a special manner to reduce as much as possible the noise escaping through the openings. Noise control in these situations is very difficult and adds considerably to the cost of the enclosure. It is also to be understood that a gas turbine power plant requires a certain volume of air for its operation. Thus, air volume is required to operate the gas turbine, to ventilate the power plant enclosure, to keep the inside of the enclosure within a tolerable range, to cool equipment within the enclosure and to perform any other required function within the enclosure. This air volume must be brought into and exhausted from the enclosure through openings therein.

Presently air flow systems for gas turbine power plants comprise two necessary and separate systems. In the first system air volume is drawn through the power plant enclosure into the gas turbine inlet, burned and exhausted out through the enclosure. The work is performed by the turbine intake air compressor. In a second system the air volume is drawn through the power plant enclosure, performs functions n the machine room and is then exhausted unburned out through the power plant enclosure via the gas turbine exhaust and the generator exhaust. The work is performed by the gas turbine exhaust gases and the generator exhaust fan.

These two systems are independent of each other except for the fact that the gas turbine exhaust gases from the first system are being utilized to help move the air volume flow of the second system. The total air intake and the total air exhaust are each equal to the sum of the first and second systems.

The two system methods of the prior art have many disadvantages of which the following are but a few. Initially it may be said that the openings and the enclosure allowing the air volume and exhausting it out are not kept to a minimum because the total air volume flow into and exhausting from the enclosure is not kept to a minimum. Because of their large size these openings must be treated in a special manner to prevent excess noise from escaping the enclosure. This has been widely recognized as being both expensive and difficult.

A further disadvantage of the prior art is that part of the air volume being moved in the second system is being powered by the exhaust gases of the second system. This requires the utilization of an aspirator which is expensive to build and presents problems in controlling the air volume being exhausted. In addition there is always the great possibility that the air turbine exhaust may leak into the machine room. These problems are not easily overcome and in some instances may not be overcome by prior art structures.

SUMMARY OF THE INVENTION

According to our invention the second system is eliminated by providing a combined system wherein the air drawn into the enclosure is first utilized for the machine room ventilation requirements and is then drawn through the compressor and exhausted to the atmosphere. Moreover, it is contemplated by our invention that only one power source, the compressor, is needed to get the power to move the air in contrast to the prior art systems in which both the compressor and gas turbine exhaust were used to move the air.

The problems which we recognized and which are solved by the present invention include keeping the air volume entering and exhausting from the enclosure to a very minimum thereby allowing the use of minimum openings in the enclosure and hence allowing less opportunity for noise to escape. A further problem is to move the air volume with the least decrease in the overall efficiency of the gas turbine power plant.

As a solution to these problems our invention provides an enclosure having air using means therein requiring a predetermined amount of air. The enclosure has at least one intake opening therein which is designed to allow the predetermined amount of air required into the enclosure. Basically the enclosure includes a machine room and air chambers. Where two motor means, usually gas turbine engines, are provided the machine room will include an electrical current generator centrally located therein, with a first and second turbine motor means disposed on opposite sides of the generator. An air chamber will be located at each end of the machine room and be completely separated therefrom by a partition wall. Each of the turbine air inlet ends will be in direct communication with the air chambers, and the plenum chambers are in direct communication with the atmosphere through an upper portion or roof of the enclosure by means of a first opening in said enclosure. Each of said air chambers is provided with a first intake enclosure. A second opening in said enclosure communicates the atmosphere to the machine room and is advantageously placed above the generator centrally in the machine room. The second opening serves to ventilate the machine room and communicates indirectly with each of the air chambers by means of first and second duct means connected to each air chamber. The first and second openings have a total air intake capacity of an amount substantially equal to the total air required by the first and second gas turbine motor means. In this manner the air intake openings to the enclosure are kept to an absolute minimum and hence the openings in the enclosure through which sound and noise may escape are also at a minimum.

A first duct means between the machine room and each of the air chambers allows communication of air from said machine room to each of said air chambers. A ventilating housing means is provided on said generator and a second duct means provides communication from said housing to each of said air chambers.

It is an important feature of this invention that the turbine has a compressor integral therewith and that this compressor on each turbine creates a suction at the inlet end of the turbine which in turn creates a low-pressure area in the air chamber whereby the predetermined amount of air is drawn into the air chambers directly through each of the first openings and indirectly through the second opening via the machine room, the generator housing and the first and second duct means.

Each of the first and second duct means may be provided with control means to allow regulation of the air passing from the first and second duct means to the air chambers. In practice these take the form of cover control plates. As another control against backfire each of the first and second ducts are provided with shutter means which close when the air pressure in the air chamber is greater than the pressure in the machine room or generator housing respectively.

Each of the turbines has an exhaust outlet communicating directly to an exhaust vent which opens to the exterior of the enclosure. This exhaust vent opening as well as the intake opening are of a minimum possible size to handle the airflow therethrough under predetermined design conditions. The includes a gas expander which allows effective flow of air through the vent.

Other objects, features and advantages of the present invention will be readily apparent from the following detailed description of certain preferred embodiments thereof taken in conjunction with the accompanying drawings in which:

BRIEF DESCRIPTION OF THE DRAWINGS

FIG. 1 is a cross-sectional elevation of an enclosure of our invention with the relative air volume added for purposes of illustration; and, FIG. 2 is a plan view of an enclosure of our invention illustrating the relative position of the generator air exhaust trench and the machine room air outlet.

DESCRIPTION OF THE PREFERRED EMBODIMENT

There is shown in FIG. 1 an enclosure generally indicated at 1 having gas turbines 2 and 3 therein which are connected by transmissions 4 and 5 to a generator generally indicated at 6. A foundation 7 supports the enclosure and the generating equipment inside.

The enclosure 1 contains the normally closed portals that allow access and egress and is sealed from the atmosphere within manufacturing tolerances except for the air intake and gas exhaust openings. In practice we have found that where two gas turbines drive a generator as illustrated, a primary air intake generally indicated at 10 and 11 adjacent to and preferably above gas turbine inlets 2a and 3a respectively allow full utilization of the primary air intakes.

Each of the primary air intakes, also referred to as a first opening, includes an opening 10a, 11a, and a silencer 10b, 11b respectively. If the enclosure has a flat roof as shown at 1a the intake silencers 10b, 11b will project thereabove a particular height which will be designed in consideration of among other things, air volume, noise to be silenced, intake efficiency and normal draft conditions. In most cases the intake will be at a level below the exhaust vent silencers to assure fresh air for the intakes. The intakes may however take other shapes and forms so long as they follow the teachings of our invention. Thus, the silencers need not by cylindrical but may have varying cross section. For purposes of illustration typical approximate air volumes have been assigned to the various air passageways and openings so that one skilled in the art may readily understand our invention. In this case we have assigned each primary air intake a capacity of 1,500 cubic feed per second.

The primary air intake opening 10a opens into a primary air intake chamber 20 which is bounded in part by the roof 1a, the exterior end wall 1b, opposite sidewalls 1d and 1e, and interior partition wall 21, a gas turbine inlet 2a and a foundation floor 7a.

Similarly the primary air intake opening 11a is through the enclosure roof 1a into an air chamber 23 which is bounded by an exterior end wall 1c, sidewalls 1d, 1e, an interior partition wall 22, a gas turbine inlet 3a and a foundation floor 7b.

The primary air intake openings and the chambers may be treated to reduce the noise transmitted therefrom. The silencers 10b, 11b have been found to be efficient and effective in reducing noise escape. Under normal operating conditions it would be expected that the entire 1,500 feet per second from a primary air intake will go directly to the gas turbine inlets 2a, 3a to be burned with the fuel. For purposes of illustration each of the gas turbines 2, 3 has been assigned an intake requirement of 2,300 cubic feet per second of air. This means that 800 cubic feet per second of air in addition to the primary air intake capacity of 1,500 cubic feet per second must be drawn in from some other source for each engine. This other source indirectly is a secondary air intake opening 12 in the roof 1a. The secondary air intake will be designed in this case to handle the total of 1,600 cubic feet per second for the two engines. Under normal design conditions the 1,600 cubic feet will be divided initially between cooling the machine room generally and the generator specifically and secondarily between the two gas turbines.

The secondary air intake, also referred to as the second opening, includes an opening 12a and a silencer portion 12b upstanding therefrom. In the illustrated embodiment we have shown the opening 12a above a generator 6; however, it must be understood that defectors, vanes or subducts may be provided therein or associated therewith to direct inlet flow directly to the generator or machine room.

From the illustrative quantitative designations it can be seen that approximately 600 cubic feet per second are drawn in through the secondary air intake, through the generator air intakes 6a, through the generator and that 300 cubic feet will be drawn by each engine to its respective chamber. Approximately 1,000 cubic feet per second is drawn in through the secondary air intake to the machine room 30 and be used by the engines, 500 cubic feet in each circulate through.

The machine room 30 is bounded by the roof 1a, opposite sidewalls 1d, 1e, foundation floor 7c and the air chamber partition walls 21, 22. At each end of the machine room foundation floor 7c first duct means which may comprise foundation air ducts 7d, 7e, connect the machine room air outlets 31, 32 respectively, with the primary air intake chamber 20, 23. With the secondary air intake centrally located with respect to the machine room outlets and with the openings of the machine room outlets carefully designed, it is to be expected that 500 cubic feet per second will pass from the machine room to the primary air intake chambers. To accommodate changing conditions each of the outlets to the foundation air ducts 7d and 7e is provided with an adjustable air intake volume control plate 40, 41, respectively, which allow quick and simple variance of the size of the openings of the ducts 7d, 7e to the air chamber 20, 21.

A grate 34 and 35 may be provided on each of the machine room air outlets 31, 32 respectively. Likewise it is contemplated that suitable drainage facilities for the machine room floor and foundation ducts could be provided if needed. The 600 cubic feet per minute of air entering through the designed generators air intakes 6a will pass through a second duct means which may comprise a generator air exhaust trench 7f where it is expected that approximately 300 cubic feet per second will flow in each direction through the trench to the air chambers 20 and 23 respectively. Again it may be seen in reference to FIG. 2 that adjustable air intake volume control plates 42, 43 serve to adjust the openings 7g, 7h from the exhaust trench 7f into the air chambers 20, 23.

The air compressor of each gas turbine supplies the air volume required for the gas turbine operation. The air compressor must move this air volume, and the fact that the air volume is performing functions before it reaches the compressor does not change the work load on the compressor unless the air volume pressure is changed. An increase in air volume pressure will make the compressor more efficient, and a decrease in air volume pressure will make the compressor less efficient. The air volume pressure is dependent on the pressure drop caused by the air volume passing through the enclosure opening, and the pressure drops and rises induced by the air volume performing its function within the enclosure. The pressure drop caused by the air volume passing through the openings in the enclosure will remain the same regardless of the function the air volume performs once it is within the enclosure. The pressure change caused by the air volume performing its function on its way to the air compressor will not be great and will not appreciably add or subtract to the efficiency of the compressor.

Each of the foundation ducts 7d, 7e and both ends of the generator air exhaust trench 7f are provided with automatic closing shutters 44, 45, 46, 47 which close when the pressure in the primary air intake chamber is greater than the pressure in the machine room or generator exhaust trench thereby preventing the passage of air from the primary air intake chamber to the machine room or the generator. This is a safety device so that if the turbine should backfire workmen in the machine room will not be put in danger.

It should now be clear that in addition to the 1,500 cubic feet per second entering the turbine through the primary air intake opening to each of the primary air intake chambers that an additional 500 cubic feet per second for each engine is drawn in through the secondary air intake opening, passes through the machine room, through the first duct means and into the air chamber to be burned, while an additional 300 cubic feet per second for each engine is drawn in through the secondary air intake, enters the generator air intakes circulates through the generator, exits through second duct means which includes the generator air exhaust duct and the exhaust trench and enters the air chamber to mingle with the other air and thereby provide each of the gas turbines with its required 2,300 cubic feet per second of air. In each case the compressor fan in the gas turbine provides the sole moving force that will suck the air in through the primary and the secondary air intakes and exhaust the burnt gases.

An outlet end 2b, 3b of the gas turbines 2, 3 each open into an exhaust vent 14, 15 respectively, each of which includes a gas expander 14a, 15a and an exhaust silencer 14b, 15b, respectively. In most conditions this exhaust vent will be directed upwardly although it need not be.

From the above description of the invention it should be readily apparent that we have overcome the disadvantages of the prior art by developing an enclosure having intakes and exhausts designed to the exact requirements of the air using means inside. Among the advantages of our invention is that a minimum amount of noise will be emitted through the opening which in turn has the accompanying benefits that installations of high noise levels such as power plants may be located closer to populated areas or electricity markets without creating a noise nuisance. Minimum openings in the enclosure means a minimum enclosure cost.

Also the minimum air usage of our invention has the advantage that the work required to move the air volume is at a minimum.

Flexibility and ease of air control is made possible by the air control means set forth. Many other means are also available such as for example to have the silencers assume a venturi configuration by means of which the exact air flow could be measured.

By means of our invention the separation of the gas turbine gases from the machine room is complete and not compromised. The safety shutters prevent even backfire contamination. Also changes in over all efficiency of the power plant due to outside forces are minimal.

Although minor modifications might be suggested by those versed in the art, it should be understood that we wish to embody within the scope of the patent warranted hereon all such modifications as reasonably and properly come within the scope of our contribution to the art.

What we claim is:

1. A building enclosure having an engine means therein, said engine means requiring a predetermined amount of air to operate efficiently, said building enclosure having first and second air inlet means therein designed to allow the exact predetermined amount of air required by said engine means to pass into said building enclosure, said engine means drawing said predetermined amount of air into said building means through said first and second air inlet means, said building including an air chamber in communication with said engine means, said first air inlet means communicating directly with said air chamber, said second air inlet means communicating indirectly with said air chamber whereby the portion of air passing into said building enclosure through said second air inlet means serves to ventilate said building before being used to operate said engine means.

2. A building enclosure according to claim 1 including a third air inlet means designed to allow only the exact predetermined amount of air required by said engine means to pass into said building enclosure, said first and third air inlet means being positioned at each end of said building enclosure and communicating directly to an air chamber which communicates with said engine means, said second air inlet means being centrally positioned in said enclosure and allowing air to pass into said enclosure, said air passing in through said first and third air inlet means communicating with said engine means through said air chambers and said air entering said building enclosure through said second air inlet means serving to ventilate the remaining portion of said enclosure prior to being used on said engine means.

3. A building enclosure according to claim 2 wherein said engine means has an exhaust duct communicating all exhaust from said engine means to the exterior of said building enclosure, said exhaust duct means being of a capacity to just handle the predetermined exhaust from said engine means.

4. A building enclosure according to claim 1 wherein said engine means has an exhaust outlet means, said exhaust outlet means serving to transmit engine exhaust out of said building enclosure.

5. A building enclosure according to claim 1 wherein said building enclosure comprises a machine room and a chamber, said engine means being located in said machine room, a first duct means allowing communication of air from said machine room to said chamber, said engine means having connected thereto a generator means, said generator means having a ventilating housing means thereabout, a second duct means, said ventilating housing means communicating with second duct means, and said second duct means communicating with said chamber whereby a portion of said air used by said engine means serves to ventilate said generator means.

6. A building enclosure according to claim 5 wherein said means for drawing air into said enclosure comprises a compressor integral with said engine means, said engine means having an inlet end communicating directly with said chamber, said compressor providing a suction at said inlet end which serves to create a low-pressure area in said whereby said predetermined amount of air is drawn thereinto directly through said first opening and indirectly through said second opening via said machine room, said generator housing, and said first and second duct means.

7. A building enclosure according to claim 6 wherein said first and second duct means are equipped with control means to allow regulation of the air passing from said first and second duct means to said plenum chamber.

8. A building enclosure according to claim 6 wherein said first and second ducts are provided with shutter means which close when the air pressure in the chamber is greater than the pressure in the machine room or generator housing means, respectively.

9. A building enclosure according to claim 1 wherein said building has an electrical current generator centrally located therein, said engine means including a first and second gas turbine means disposed on opposite sides of said generator and operatively coupled thereto to turn said generator, said building enclosure means having opposite first and seconds ends, a chamber being located at each of said first and second ends and separated from the interior of said building enclosure means by a partition wall, each of said gas turbines having an air inlet and an exhaust outlet, said air inlets being in direct communication with said chambers, said chambers being in direct communication with the atmosphere exterior of the building enclosure means through an upper portion or roof of the enclosure by means of a first opening in said enclosure, a second opening in said enclosure communicating the atmosphere exterior of the said building to the machine room, said second opening being centrally located in said building means generally above the generator, said first and second openings having a total air intake capacity of an amount substantially equal to the total air required by said first and second gas turbines whereby the air intake openings to the enclosure are kept to a minimum.